United States Patent [19]

Abe

[11] Patent Number: 4,908,922
[45] Date of Patent: Mar. 20, 1990

[54] METHOD FOR FABRICATING OF SPINDLE HOUSING WITH BEARING

[75] Inventor: Shinji Abe, Osaka, Japan

[73] Assignee: Koyo Seiko Co., Ltd., Osaka, Japan

[21] Appl. No.: 289,727

[22] Filed: Dec. 27, 1988

[30] Foreign Application Priority Data

Dec. 28, 1987 [JP] Japan ................................ 62-336604

[51] Int. Cl.[4] ........................ B29C 45/14; B29C 39/10
[52] U.S. Cl. .......................... 29/898.062; 264/229;
264/242; 264/275; 29/898.12
[58] Field of Search ................ 264/229, 242, 275;
29/149.5 R

[56] References Cited

U.S. PATENT DOCUMENTS 4,603,025 7/1986 Landay et al. ..................... 264/242

Primary Examiner—Jan H. Silbaugh
Assistant Examiner—Catherine Timm
Attorney, Agent, or Firm—Birch, Stewart, Kolasch & Birch

[57] ABSTRACT

A method for fabricating a spindle housing with a ball bearing has the following steps: positioning the ball bearing in a cavity of a molding tool in a condition that a pre-load is provided to eliminate an internal clearance of the ball bearing, and injecting synthetic resin within the cavity of the molding tool after relative movement of the outer race and inner races of the ball bearing due to the pre-load.

6 Claims, 4 Drawing Sheets

METHOD FOR FABRICATING OF SPINDLE HOUSING WITH BEARING

BACKGROUND OF THE PRESENT INVENTION

The present invention relates to a method and an apparatus for fabricating a spinde housing with a ball bearing and, more particularly, relates to a method and an apparatus for fabricating a spindle housing with a ball bearing so as to eliminate variations in the built-in breadth of a molded plastic housing with a ball bearing.

FIG. 4 shows the conventional spindle assembly which is incorporated as a spindle assembly for a floppy disk of an office automation (OA) equipment. In FIG. 4, numeral 10 designates a spindle housing made of synthetic resin and fixed on a base plate 11. A cup 15 is rotatably supported by two ball bearings 13 and 14 mounted in a cylinder 12 of the spindle housing 10. The cup 15 is coupled to a holder 16 with a screw 17. The spindle housing 10 is formed directly on the ball bearing 14 by fabricating. The other ball bearing 13 is mounted in a cylinder 12 of the spindle housing 10 after a molding operation. A laminated spring 19 is interposed between an inwardly-directed flange 18 of the cylinder 12 and an outer race of the ball bearing 13. The elastic force of the spring 19 affords a pre-load to the ball bearings 13 and 14 to eliminate internal clearances of the ball bearings 13 and 14.

In the above-structured spindle assembly, conventionally, it is necessary that the variations in an axial distance L between an edge (a) of a fixing portion 20 of the housing 10 and an upper face (b) of the cup 15 are limited within a predetermined allowance, so that the relative positioning of a floppy disk 21 and a head 22 (both shown in dashed lines) is controlled. The variations in the built-up breadth (L) are equal to the sum of the respective variations in an axial distance (c) of the housing 10, an assembled breadth (d) of the ball bearing 14, and an axial distance (e) of the cup 15.

Since the cup 15 is normally made of aluminum, numerically controlled machining can be applied to it to make the variations in the distance (e) of the cup 15 extremely small. Also, the housing 10 having little variations in the distance (c) can be obtained because the housing 10 is molded. On the contrary, the ball bearing 14 has radial clearance, race curvature ratio of the inner and the outer races, the diameter of the ball, and the deflection of the raceway track as a variety of reasons for the variations. The variations in the assembled breadth (d) of the ball bearing 14 might exceed the total allowance of the variations in the built-up breadth (L) of the spindle assembly. Owing to the main reason of the variations of the assembled breadth (d) of the ball bearing 14, the variation in the built-up breadth (L) of the spindle assembly cannot be limited within the total allowance of the variations by conventional molding and assembling.

Therefore, conventionally, after assembly, the edge (b) of the cup 15 is finished with machining, so that the variations in the built-up breadth (L) of the spindle assembly are limited within the total allowance of the variations; however, this operating is troublesome. Particular machining equipment must be provided.

SUMMARY OF THE INVENTION

Accordingly, an object of the present invention is to provide an improved method and apparatus for fabricating a spindle housing with a ball bearing for always positioning a side of the ball bearing at the predetermined position of the axial direction of the spindle housing.

Another object of the present invention is to provide an improved fabricating method and apparatus for absorbing the variations in built-up breadth between a driven member attached to a side of a ball bearing and a spindle housing within an allowance amount simply by attaching the driven member to the spindle housing.

In accordance with a preferred embodiment of the present invention, a method is provided for fabricating a spindle housing with a ball bearing, and comprises the steps of: positioning said ball bearing in a cavity of a molding tool in a condition that a pre-load to eliminate an internal clearance of said ball bearing is provided to said ball bearing; and injecting synthetic resin within said cavity of said molding tool after relative movement of the outer and inner races of said ball bearing by said pre-load. An apparatus for fabricating a spindle housing with a ball bering is also provided comprising a molding tool, the molding tool forms a cavity for setting said ball bearing and one molding tool part of said molding tool provides the ball bearing with a pre-load to eliminate an internal clearance of said ball bearing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
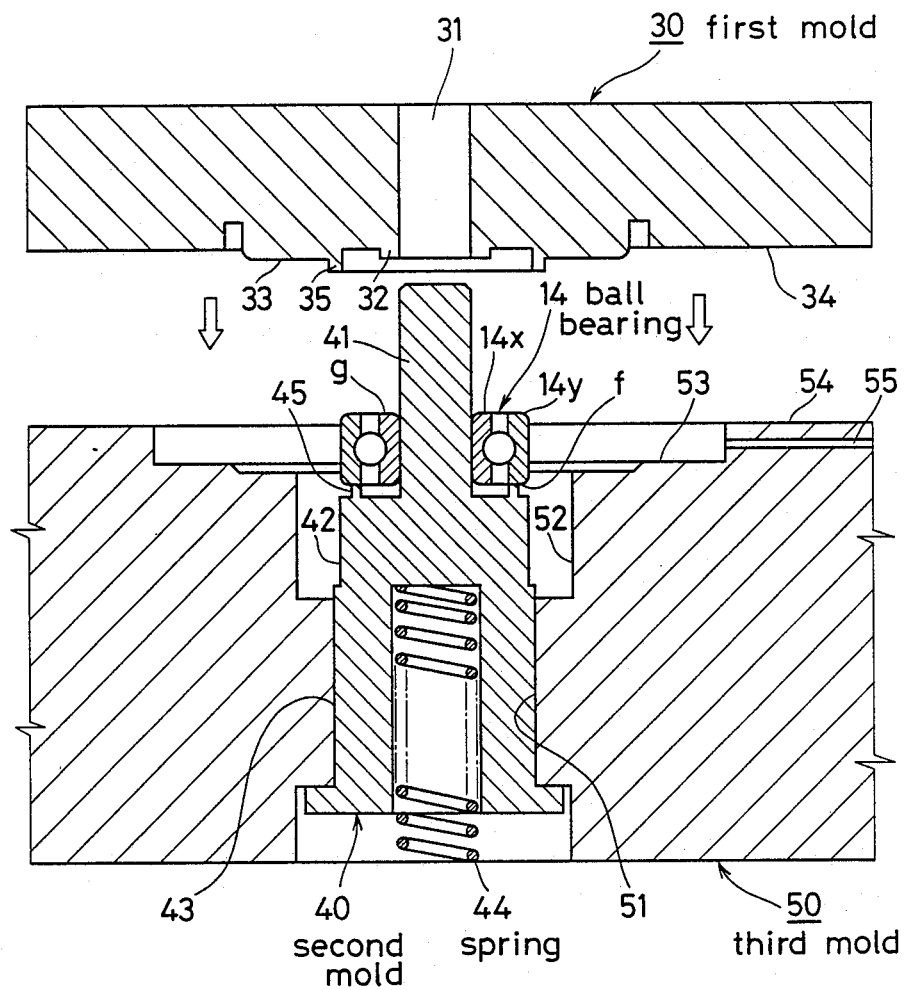
FIG. 1 is a vertical sectional view of a molding tool for the production of a housing with a ball bearing according to a preferred embodiment of the present invention, before it is molded.
Figure 2:
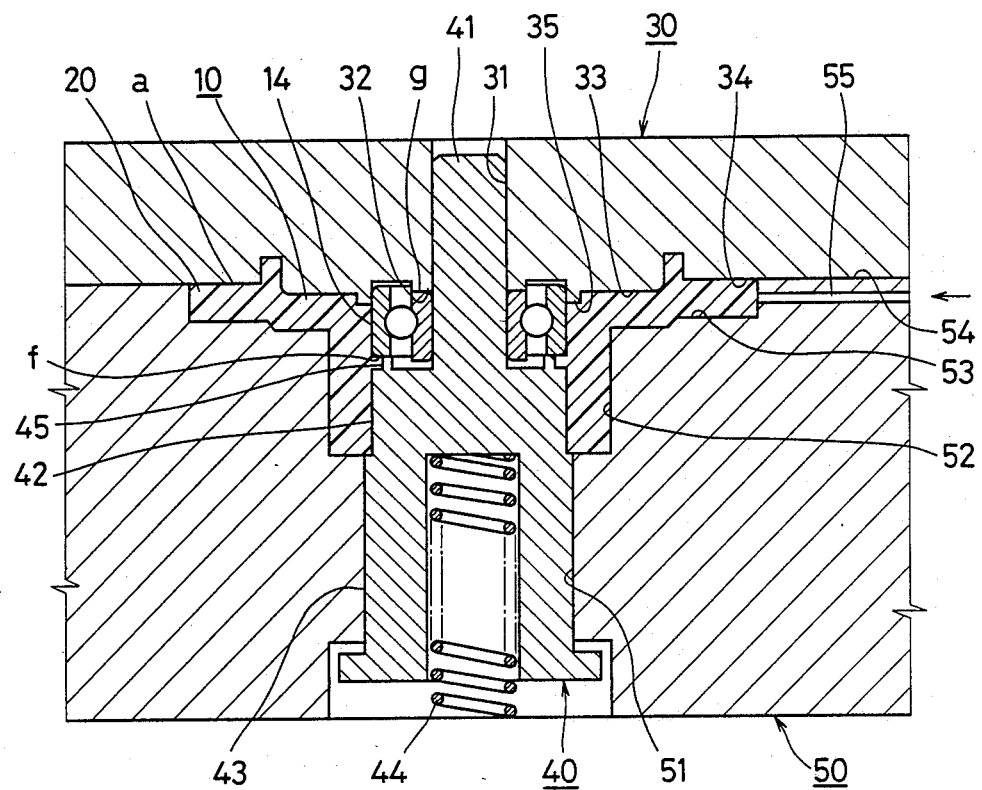
FIG. 2 is a vertical sectional view of the housing with the ball bearing after it was molded.
Figure 3:
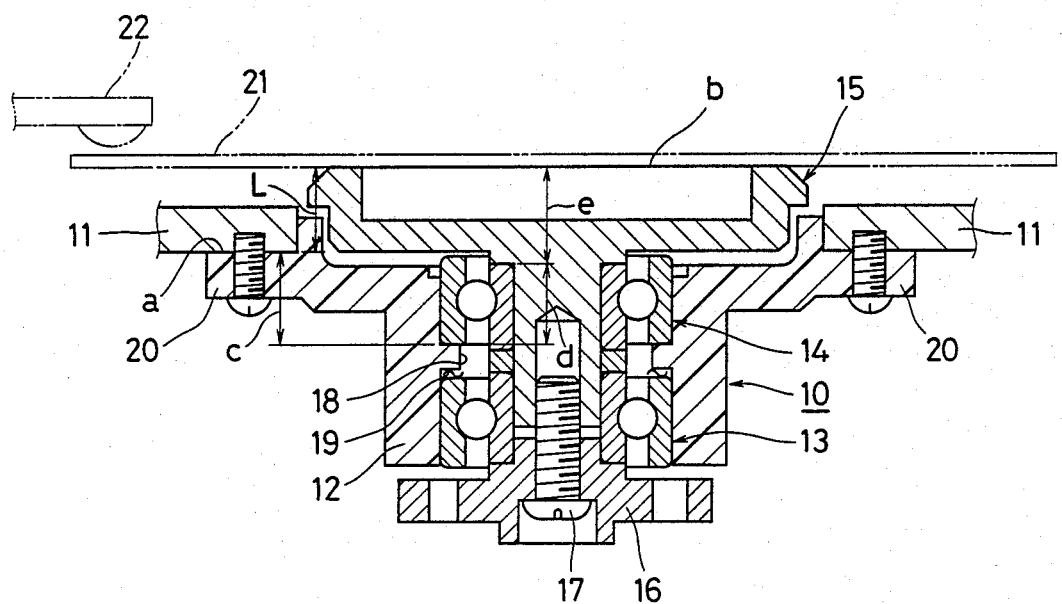
FIG. 3 is a vertical sectional view of a spindle assembly with the ball bearing produced by the preferred embodiment of the present invention.
Figure 4:
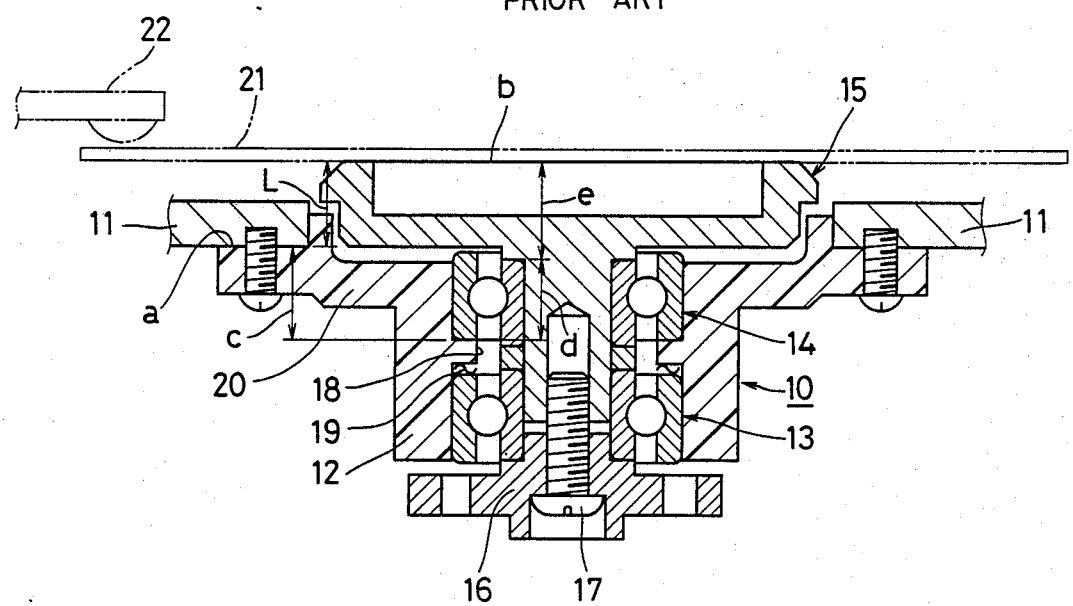
FIG. 4 is a vertical sectional view of the conventional spindle assembly.

FIGS. 1 through 3 show a method and an apparatus for fabricating a housing with a ball bearing according to a preferred embodiment of the present invention. Like numerals corresponding to those of FIG. 4 indicate like elements in FIGS. 1 through 3. According to the preferred embodiment of the present invention, a spindle housing 10 is molded in three molding tool parts into which a ball bearing 14 is inserted. The three molding tool parts used for the preferred embodiment will be described below.

A first molding tool part 30 having a circular through-hole 31 at the center is flat. An annular projection 32 is provided at the periphery of an opening edge of the circular through-hole 31 and at the lower side of the first molding tool 30. Stepwise, coaxial, annular planes 33 and 34 are provided.

A second molding tool part 40 has a shaft portion 41 inserted into the circular through-hole 31 of the first molding tool part 30, a small cylindrical portion 42 extended from an end of the shaft portion 41, and a large cylindrical hollow portion 43 extended from the small cylindrical portion 42. A spring 44 is stored within the inner side of the large cylindrical hollow portion 43. The spring 44 is provided for elastically stressing the second molding tool part 40 into the first molding tool part 30.

A third molding tool part 50 has a through-hole 51, to which the large cylindrical hollow portion 43 of the second molding tool part 40 is inserted. This part 50 also has concave faces 52 and 53 for forming portions of a cavity of the spindle housing to be molded between the tool parts, and an annular plane 54 close to a portion of the annular plane 34 of the first molding tool part 30. An injection passway 55 for injecting synthetic resin is provided in the third molding tool part 50.

While the second molding tool part 40 is supported for inserting into the through-hole 51 of the third molding tool part 50, the first molding tool part 30 can be separated from the second molding tool part 40 and the third molding tool part 50.

Using the above molding tools, the molding operation of the present invention will now be described. First as shown in FIG. 2, the ball bearing 14 is inserted into the bottom side of the shaft portion 41 of the second molding tool part 40.

As shown by the arrow of FIG. 1, the first molding tool part 30 is moved toward the second molding tool part 40 and the third molding tool part 50 to achieve the positioning of FIG. 2. At this time, the shaft portion 41 of the second molding tool part 40 is inserted into the through-hole 31 of the first molding tool part 30, while the annular plane 34 of the first molding tool part 30 is positioned to close to the annular plane 54 of the third molding tool part 50 to make the assembly as shown in FIG. 2. Therefore, the second molding tool part 40 is pressed downward in the through-hole 51 of the third molding tool part 50 against the spring force of the spring 44.

The second molding tool part 40 is forced upward to the first molding tool part 30 with the spring force of the spring 44 under the condition that a side (f) of the outer race 14y of the ball bearing 14 is in contact with the annular projection 45 of the second molding tool part 40 and a side (g) of the inner race 14x of the ball bearing 14 is in contact with the annular projection 32 of the first molding tool part 30. As described above, a pre-load for eliminating an internal clearance of the ball bearing 14 is provided, namely, providing the maximum shift between the inner race 14x and the outer race 14y, in the axial direction of the ball bearing 14. And then, the outer race 146y of the ball bearing 14 is moved and fixed while the inner race 14x of the ball bearing 14 becomes firmly fixed.

The relative vertical position between the inner race 14x and a space for the spindle housing 10 is set to be fixed. Preferably, the magnitude of the pre-load to be applied should be about 7-15% of the still safe working load of the ball bearing 14. The other side of the inner race 14x and the other side of the outer race 14y are separated from the first molding tool part 30 and the second molding tool part 40 by a predetermined distance.

Under the above condition, synthetic resin is introduced via a passway 55 into a cavity defined by the annular planes 33 and 34 of the first molding tool part 30, the small cylindrical portion 42 of the second molding tool part 40, and the concave faces 52 and 53 of the third molding tool part 50. Preferably, the synthetic resin may be polyphenylene sulfide and the molding temperature for the mold should be about 85 to 95 degrees centigrade, so that the injection pressure of the synthetic resin may be about 1,000 to 1,100 kg/cm². The relative vertical position between the inner race 14x of the ball bearing 14 and the spindle housing 10 is fixed. The annular projection 35 provided on the annular plane 33 of the first molding tool part 30 serves to prevent the synthetic resin from going around the outer diameter of the outer race 14y of the ball bearing 14 during the injection of the synthetic resin.

Thus, the variations in the built-up breadth (d) of the ball bearing 14 can be absorbed at the molding stage of the spindle housing 10. In other words, the annular plane 34 of the first molding tool part 30 positions a face (a) of an assembly portion 20 of the spindle housing 10, while the annular projection 32 of the first molding tool part 30 positions a side (g) of the inner race 14x of the ball bearing 14, so that the relative vertical position between the face (a) of the assembly portion 20 and the side (g) of the inner race 14x can be fixed.

A cup 15 as (a driven member) is thereafter positioned at the inner race 14x of the ball bearing 14 integrally molded with the spindle housing 10. The relative vertical position between the face of the cup 15 and that of the spindle housing 10 is always constant according to the present invention.

After molding the spindle housing 10, any shrinkage may occur to shift the height of the face (a) of the assembly portion 20 somewhat. Some deviation between the face (a) and the side (g) of the inner race 14x may therefore be possible. However, the amount of shrinkage can be extremely minimal due to the use of high property engineering plastic and controlling of the fabrication conditions.

FIG. 3 shows a spindle assembly assembled with the spindle housing 10 containing the ball bearing 14, the cup 15, an additional ball bearing 13, and a holder 16. The variations of the built-up breadth (L) of the assembled spindle do not contain the variations in the built-up breadth (d) of the ball bearing 14, and the variations of the built-up breadth (L) are equal to the sum of those of the breadth (c) of the spindle housing 10 due to shrinkage and those of the breadth (e) of the cup 15.

As discussed with the conventional case, the variations of the breadth (e) of the cup 15 can be extremely minimal and the variations of the breadht (c) due to shrinkage can be also extremely minimal. Therefore, the variations of the buil-up breadth (L) owing to these factors cannot exceed a permissible length.

In the above spindle using the spindle housing 10 incorporating the ball bearing 14 according to the preferred embodiment of the present invention, mere combination of the individual components enables the variations of the built-up breadth (L) of the spindle to be limited within a permissible length. Grinding of the edge (b) of the cup 15 after assembly is unnecessary.

In the above preferred embodiment, the pre-load of the ball bearing 14 in the axial direction is afforded by forcing the second molding tool part 40 into the first molding tool part 30, but should not be limited to it.

As described above, in accordance with the present invention, the side of the ball bearing attached to the driven member is positioned at the predetermined position of the axial direction of the spindle housing, the variations in built-up breadth between the driven member and the spindle housing can be absorbed. It is unnecessary to grind after assembly like the conventional case, so that the assembly steps can be reduced and no particular grinding equipment is required.

While only certain embodiments of the present invention have been described, it will be apparent to those skilled in the art that various changes and modifications may be made therein without departing from the spirit and scope of the invention as claimed.

What is claimed is:

1. A method for fabricating a spindle housing with a ball bering, comprising the steps of:
    positioning said ball bearing having outer and inner races in a cavity of a molding tool in a condition such that a pre-load is applied in an axial direction against one of said races on one side of said ball bearing while an opposing force is applied on an opposite side of said ball bearing to the other said races which eliminates an internal clearance of said ball bearing by causing relative movement of said outer and inner races of said ball bearing in response to said pre-load; and thereafter
    injecting synthetic resin within said cavity of said molding tool against said bearing as positioned to form said spindle housing.

2. The method of claim 1, further comprising the step of using a molding tool part of said molding tool stressed with a spring and facing a side of said outer race of said ball bearing to apply said pre-load.

3. The method of claim 1, further comprising the step of using a magnitude for said pre-load of about 7 to 15% of the safe working load of said ball bearing.

4. The method of claim 1, further comprising the step of using a polyphenylene sulfide as the synthetic resin.

5. The method of claim 1, further comprising the steps of using a molding temperature of about 85 to 95 degrees centigrade and using an injection pressure of about 1,000 to 1,100 kg/cm$^2$.

6. The method for fabricating a spindle housing of claim 1, further comprising the step of attaching a driven member to said ball bearing.

* * * * *